United States Patent [19]

Inez

[11] Patent Number: 5,247,983
[45] Date of Patent: Sep. 28, 1993

[54] TIRE REGROOVING DEVICE

[75] Inventor: Arthur Inez, Cournon, France

[73] Assignee: Compagnie General de Establissements MICHELIN, Clermont-Ferrand, France

[21] Appl. No.: 768,840

[22] Filed: Sep. 30, 1991

[30] Foreign Application Priority Data

Oct. 2, 1990 [FR] France .................. 90 12226

[51] Int. Cl.⁵ ............................................. B29D 30/68
[52] U.S. Cl. .................................. 157/13; 30/140
[58] Field of Search .............. 157/13; 30/140, 293, 30/280; 83/171, 875

[56] References Cited

U.S. PATENT DOCUMENTS 2,063,894 12/1936 Jack et al. ...................... 30/140
2,222,036 11/1940 Koppin et al. .................. 30/140
2,254,974 9/1941 Olson et al. .................... 30/140
2,896,059 7/1959 Ruff ............................... 30/140
3,850,222 11/1974 Lejuene .......................... 157/13
4,147,196 4/1979 Jarry ............................... 157/13
5,065,804 11/1991 Kinuhata et al. ............... 157/13

Primary Examiner—D. S. Meislin
Attorney, Agent, or Firm—Robert R. Reed

[57] ABSTRACT

This device, designed for recutting the grooves of pneumatic tire treads, is composed of a knife whose shape corresponds to the said groove section to be recut and an adjustable depth guide that presses against the bottom of the existing groove before making it deeper, so that the depth of the cutting is determined by the existing distance (d) between the said knife and the depth guide.

2 Claims, 2 Drawing Sheets

TIRE REGROOVING DEVICE

TECHNICAL FIELD

The present invention relates to the renovation of tires by regrooving their tread patterns. More particularly, it concerns a portable device to perform this operation manually.

BACKGROUND

Such devices are well known. We can see an example of them in U.S. Pat. No. 2,222,036. The regrooving knife has the general shape of a "U", with the exact profile of the groove one wishes to cut, or deepen. This knife is usually heated to facilitate the operation. It is very important to respect a certain regrooving depth. To achieve, this, the portable devices for manual use have a base that is supported by the surface of the tire to be regrooved, the depth of knife penetration being adjusted in relation to this base.

Absolute control of this regrooving depth is important in order to not reach the reinforcement contained in the carcass, the tire belt or the belt protection ply. This is the reason why attempts have been made to automate this regrooving operation, in order to guarantee its quality and consistency. The U.S. Pat. No. 4,147,196 describes a machine with a probe that measures either the position of the metallic plies laid under the tread, or the exact relative position of the tire surface, in order to control the depth of penetration of the regrooving knife.

The purpose of the present invention is to make this regrooving operation even more precise. This regrooving operation is particularly used in heavy-duty truck tires. Regrooving obviously prolongs the tire's use. When a regrooved tread pattern wears out, the tire is usually recapped, resulting in a new use cycle that could end with a second regrooving. Therefore, it is extremely important that the regrooving operation not destroy the reinforcement structure of the tire, not only for safe operation of the regrooved tire, but also for economic reasons. Any degradation of the reinforcement structure risks making the carcass unusable for recapping or, at the very least, making recapping more costly.

SUMMARY OF THE INVENTION

The goal of this invention is to locate a precise and reliable geometric reference on the tire with which to base the regrooving operation. The invention is based on various observations including when the tire is worn out in an irregular manner and even when the wear shape is such that the section of the tire surface clearly deviates form a circular shape in planes perpendicular to the axis of rotation. There still remains, at the surface of the tire, one geometric feature that always retains the precise shape of the new tire. This feature is the bottom of the tread pattern. On a new tire, the tread patterns are molded in such a way that they leave a subtread which is a thickness of rubber between the bottom of the tread pattern and the highest radially outward part of the reinforcement. The depth of this subtread is precisely determined and well known for each type of tire, since it is a fabrication specification.

Thus, the invention proposes to use for regrooving a device that rests against the bottom of the tread pattern to be regrooved, and not on the tire surface, as disclosed in the prior art. In particular, it is proposed to use a manual device because, as herein disclosed, this type of device is quite compatible with the high degree of precision required.

According to the invention, the device designed for cutting the grooves of tire treads, is composed of a knife whose shape corresponds to the section of the said grooves to be cut and is characterized by an adjustable depth guide that presses against the bottom of the existing groove before cutting, so that the regrooving depth is determined by the distance (d) between the said knife bottom edge and the guide contact point.

BRIEF DESCRIPTION OF THE DRAWINGS

The attached figures, in conjunction with the following descriptions, will fully disclose this invention.

FIG. 3: is a side view of the same device shown in FIG. 1.

DETAILED DESCRIPTION AND PREFERRED EMBODIMENTS

Figure 2:
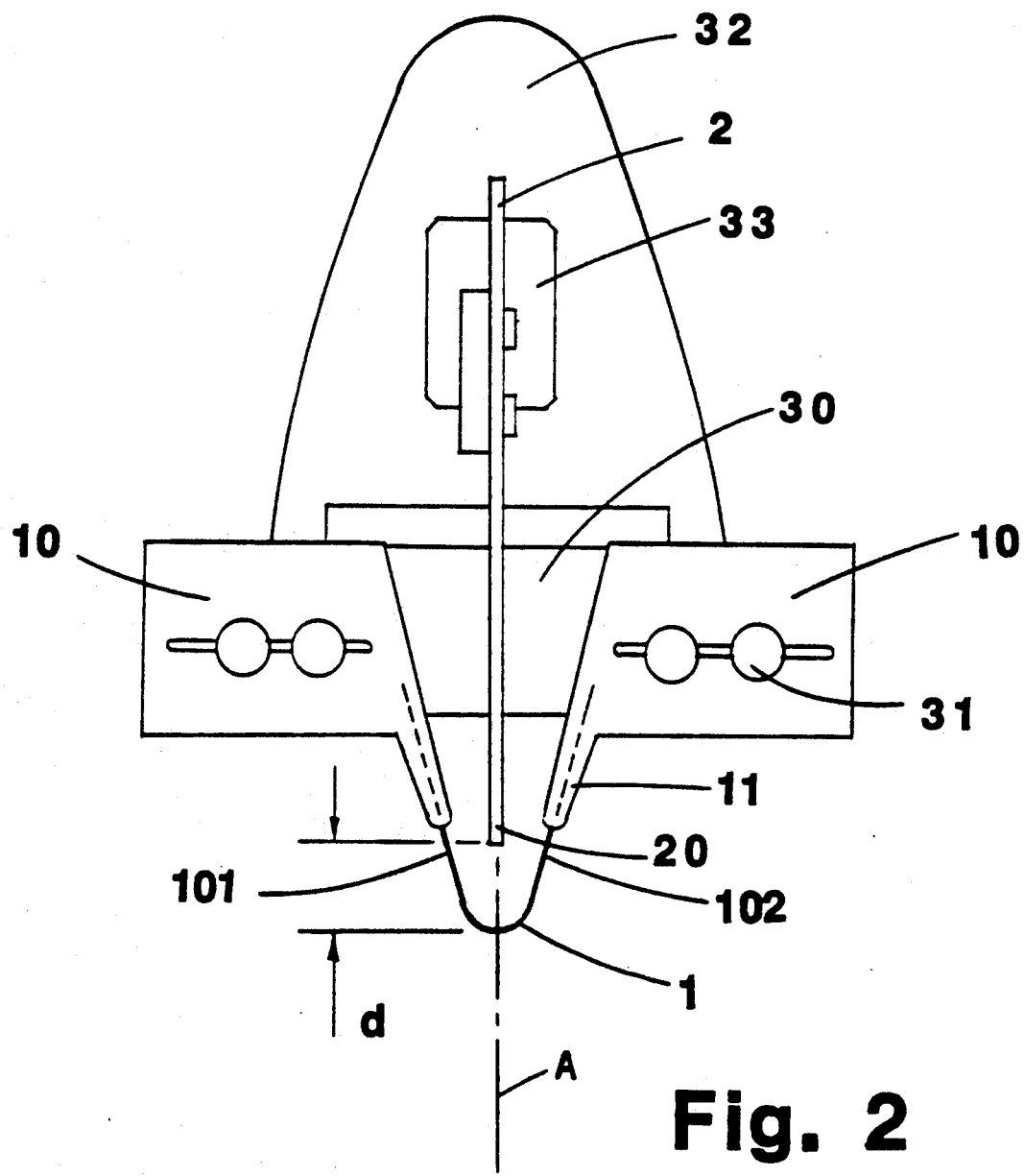
FIG. 2: is a front view of the same device shown in FIG. 1.

In FIG. 2, we can see very well the profile of knife 1 whose shape corresponds to the section of grooves to be cut. This knife is composed of a blade bent so that it has the general shape of a "U". The ends of knife 1 are embedded in the anchoring clips 10 of knife 1. The knife used is preferably heated and the extensions 11 of these clips, directly surrounding the knife 1, are sized in such a way to serve as thermal mass temperature regulators for knife 1, so that it never heats up to the point of losing its mechanical properties when the device is raised and no heat is dissipated by the tire.

The clips 10 are attached to a first support 30, by means of bolts 31; the first support is itself integral with a handle 32 for manual use of the regrooving device, in the embodiment of the invention illustrated. The device is designed to use a predetermined number or series of knives 1 during normal usage. The choice of a knife from this series depends on the section of the groove to be cut.

A second support 33 is attached to the upper end of handle 32, which holds guide 2 for adjusting the depth of the knife 1 cut. Preferably, base 20 of guide 2 and knife 1 are positioned approximately in the same plane, in order to assure a guiding as precise as possible. In other words, since the knife always has the shape of a "U", the said base 20 is placed at the transverse midpoint of the prongs 101, 102 of knife 1.

On the side opposite from base 20, guide 2 has a slot 21. It is attached to the second support 33 by two screws 22 passing through slot 21. The guide has a depth scale 23 that, thanks to an index marker 34 engraved on the second support 33, allows one to easily adjust the regrooving depths, determined by the distance "d" that one can measure, in the radial direction of a tire 4 which is the up and down direction of guide 2, between the knife 1 and the base 20 of guide 2. Maximum regrooving depth (maximum value of d) is attained when base 20 of guide 2 reaches approximately the level where clips 10 and extensions 11 can not retain knife 2.

Figure 1:
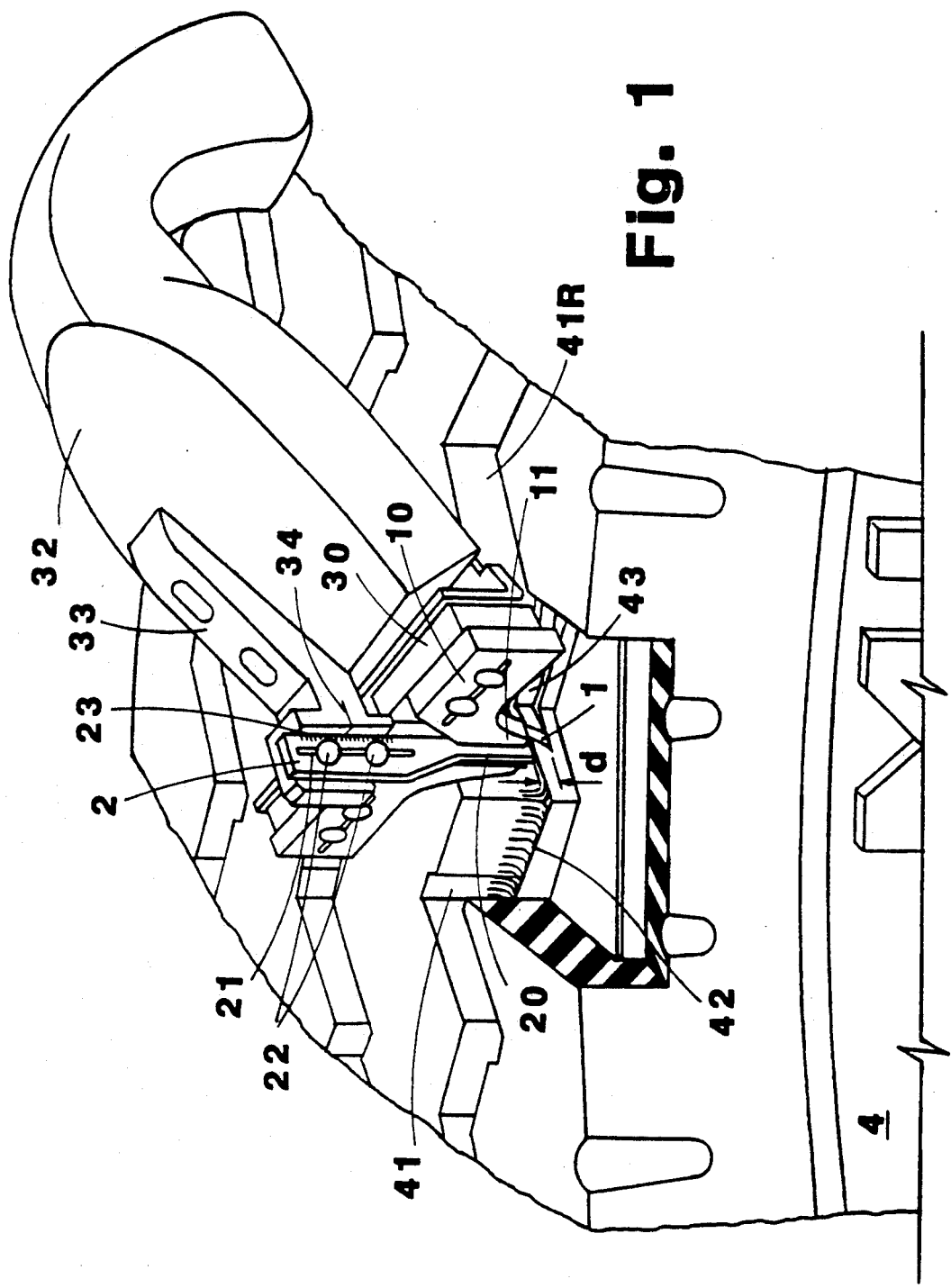
FIG. 1: shows a regrooving device in operation, as seen from the above the tire.

FIG. 1 illustrates the position of the regrooving device during operation. We see the tire 4 to be regrooved, whose grooves 41 are too shallow for continued use of the tire. The device is held in relation to the tire 4 so that knife 1 and guide 2 are directed approximately radially to the tire 4. The partial tire section shows knife 1 and guide 2 in operation where the knife 1 and the guide 2 are aligned with the centerline axis A of the groove 41 before being regrooved.

Knife 1 is engaged in what remains of groove 41 and embedded in the rubber until base 20 of guide 2 butts against the bottom 42 of the said groove 41 (See FIG. 3). It is necessary then to follow the tread pattern all around the tire 4 tread surface by maintaining the device pressed radially against the tire. After removal of the trimmings 43, one obtains the regrooved groove 41R. Note that this device automatically assures reproduction of wear bars 44 present in the bottom of the tread pattern, which constitutes another advantage of the present invention.

To increase the reliability of the device in operation, all attempts to regroove again an already renovated groove 41R must be prevented. For this purpose, one can add to the device an adjustable plate that butts against the surface of the tire, exactly like in the known devices. This plate thus plays only a regroove limiting role, and does not serve as the regrooving reference.

We can see that the invention regrooves tires in a very precise manner, even though it is a portable device that is very economical to operate and easy to use manually. Good quality regrooving can thus be performed even in small, remote repair shops.

Further features of the present invention and preferred embodiments disclosed herein will become apparent to those skilled in the art to which the present invention relates from reading these specification.

Having described the preferred embodiment of the invention, what is claimed is:

1. A device for cutting grooves of a tire tread, comprising:

a knife whose shape corresponds to said grooves to be cut;

an adjustable depth guide that presses against a bottom surface of a respective groove of said tire tread before recutting, wherein the depth of the cutting is determined by a predetermined radial distance between said knife and said guide when positioned on said tire tread;

a base of said guide being positioned at the transverse midpoint of two prongs of said knife and aligned with a centerline axis of said groove;

a handle designed for manual use and having a second support rigidly attached thereto, said guide being adjustably attached to said second integral support; and a first integral support being rigidly attached to said handle and having a pair of anchoring clips adjustably attached thereto, each said anchoring clip having an extension to receive and hold a respective prong of said knife for cutting, wherein said handle provides the structure for positioning and holding said guide with respect to said knife.

2. The device according to claim 1, wherein said knife comprises:

means for heating said knife when said knife is embedded in anchoring clips of said device.

* * * * *